United States Patent [19]
Giorgi et al.

[11] Patent Number: 5,802,446
[45] Date of Patent: Sep. 1, 1998

[54] METHOD AND APPARATUS FOR TESTING A COMMUNICATION CHANNEL

[75] Inventors: Sabine Giorgi, La Varenne St Hilaire; Antoine Chouly, Paris; Bruno Ballarin, La Varenne St Hilaire, all of France

[73] Assignee: U.S. Philips Corporation, New York, N.Y.

[21] Appl. No.: 612,156

[22] Filed: Mar. 7, 1996

[30] Foreign Application Priority Data

Mar. 8, 1995 [FR] France ................. 95 02712

[51] Int. Cl.⁶ ............... H04B 3/46; H04B 17/00
[52] U.S. Cl. ............... 455/69; 455/62; 455/67.4; 455/68; 455/67.3; 455/67.1; 364/481; 364/553; 364/551.01; 364/550; 364/576; 370/241; 370/252; 375/222; 375/224; 375/227
[58] Field of Search ............... 364/481, 222.2, 364/553, 576, 705.05, 551.01, 550, 571.01; 375/200, 222, 224, 225, 227, 239, 208, 260, 346, 349; 370/241, 252, 282, 332, 464, 477; 380/21, 33, 34, 39; 455/62, 39, 68, 69, 135, 37.1, 67.3, 67.4; 395/200.3, 200.54, 183.01

[56] References Cited

U.S. PATENT DOCUMENTS

| | | | |
|---|---|---|---|
| 4,633,411 | 12/1986 | Bliss | 364/481 |
| 5,048,054 | 9/1991 | Eyuboglu et al. | 375/222 |
| 5,214,675 | 5/1993 | Mueller et al. | 375/340 |
| 5,297,186 | 3/1994 | Dong | 375/222 |
| 5,305,468 | 4/1994 | Bruckert et al. | 455/69 |
| 5,379,324 | 1/1995 | Mueller et al. | 375/340 |
| 5,386,589 | 1/1995 | Kanai | 455/33.1 |
| 5,392,314 | 2/1995 | Wolf | 375/224 |
| 5,450,623 | 9/1995 | Yokoyama et al. | 455/226.1 |
| 5,566,165 | 10/1996 | Sawahashi et al. | 370/342 |

*Primary Examiner*—Emanuel Todd Voeltz
*Assistant Examiner*—Tuan Q. Dam
*Attorney, Agent, or Firm*—Steven R. Biren

[57] ABSTRACT

A communication system having a transmitter that supplies test sequences formed from several test frequencies and a receiver having test means for testing the quality of a channel. The test means calculates for the plurality of frequencies both the transfer function of the channel and the channel noise variance. By taking the noise caused by the receiver into account, the test means determine the most suitable frequency band and bit rate for the transmission. This information is supplied to the transmitter to establish the transmission.

5 Claims, 4 Drawing Sheets

METHOD AND APPARATUS FOR TESTING A COMMUNICATION CHANNEL

TECHNICAL FIELD

The invention relates to a communication system which calculates a transfer function of the communication channel it is employing and based thereon selects at least one frequency band for communication.

BACKGROUND OF THE INVENTION

The transmission between two stations may be subjected to all sorts of disturbances which may harm the quality of the transmission. In practice it is thus necessary to carry out beforehand a test procedure of the channel before the optimum conditions for transmission are determined. This procedure comprises, for example, sending by the channel signals that have given frequencies, and examining at the other end of the channel the disturbance that has been brought about during transmission. Such a procedure exists, for example, in the case of communication by telephone lines.

A method and an analyzer for testing the quality of the communication channels are described, for example, in U.S. Pat. No. 4,633,411 which relates to high-frequency communication systems. The channel is tested by transmitting by a generator at the beginning of the communication a certain number of signals at known frequencies and by examining the quality of the received signals at the output of the channel by a processor. The signals undergo a Fourier transformation from the time domain to the frequency domain in order to estimate the spectral power of the received signals. Furthermore, a noise power is calculated during periods of silence in which there is no transmission of signals at known frequencies. By calculating a spectral-power-to-noise-power ratio it is thus possible to determine the most favourable transmission band for carrying out the transmission.

There may be communication conditions which do not permit the use of such a procedure, more particularly, with bidirectional transmissions for which echo phenomena render the noise measurements impossible during these periods of silence, even in the case where these periods are expected. This procedure cannot be used in the case where periods of silence are not expected.

SUMMARY OF THE INVENTION

It is thus an object of the invention to permit the testing of the quality of a communication channel even in the case of echoes of continuous transmission, by calculating a channel noise power during transmission. A particular object is to permit the testing of a communication line which operates in a bidirectional mode.

This object is achieved with a communication system having test means which include calculation means for calculating, for various bit rates and for the plurality of test frequencies, during transmission a channel noise power in frequency bands, calculation means for calculating for each band a ratio between a power of the signal of the sequence and a noise power including the channel noise power and a variance estimated beforehand of the noise caused by the receiving means, comparing means for comparing for each band the ratio with a theoretical maximum ratio that belongs to each band, and selecting means for selecting the bands and the bit rates for which the ratios are smaller than the respective theoretical maximum ratios and for transmitting the selection to the transmitting means.

The invention likewise relates to a method of testing a communication channel by transmitting by the channel via transmitting means a test sequence which has a plurality of test frequencies and for selecting on the receiving side at least one frequency band suitable for transmission, while the method includes the following steps carried out by receiving means:

sampling of the received sequence, performing, for various frequency bands and for various bit rates, at least one Fourier transform to calculate for the plurality of frequencies the channel transfer function and to derive therefrom a signal power within the band and a channel noise power within the band, during the transmitting calculating a ratio between the signal power and a noise power which includes the channel noise power and a variance, estimated beforehand, of the noise caused by receiving means, comparing for each band the ratio with a theoretical maximum ratio belonging to each band, selecting the bands and the rates for which the ratios are smaller than the respective theoretical maximum ratios, and transmitting the selection to the transmitting means.

Thus, it is possible to test the channel even if no moments of silence occur during the transmission of the sequences. Moreover, by measuring the channel noise power and by taking the variance of the noise caused by the called station into account, it is advantageously possible to obtain spectral-noise-to-total-noise-power ratios which are practically the same as the theoretical maximum ratios (which corresponds to ideal transmission conditions, that is to say, for a perfect flat-response transmission line). Therefore, with real channels, the test method and the system implementing the method produce test results which have a far better quality than the known technique.

This makes it possible for the called station to determine the frequency bands and the rates that are suitable for transmission. When the tests are started, the called station transmits this information to the calling station to establish the communication.

To define the noise caused by the called station, the method utilizes a preliminary step of estimating the variance of the noise caused by the receiving means. One way this step is carried out may be by comparing the signal-to-noise ratio at the output of the receiving means with the signal-to-noise ratio measured at the output of the channel for at least one channel that has known characteristic features.

DETAILED DESCRIPTION

Let us consider by way of example the case of transmissions performed with a modem which applies the test procedure V.34 defined by a Recommendation of CCITT for telephone networks. Evidently, the invention also relates to other applications which use other test sequences which comprise various tones of which the object is to test communication channels.

Figure 1:
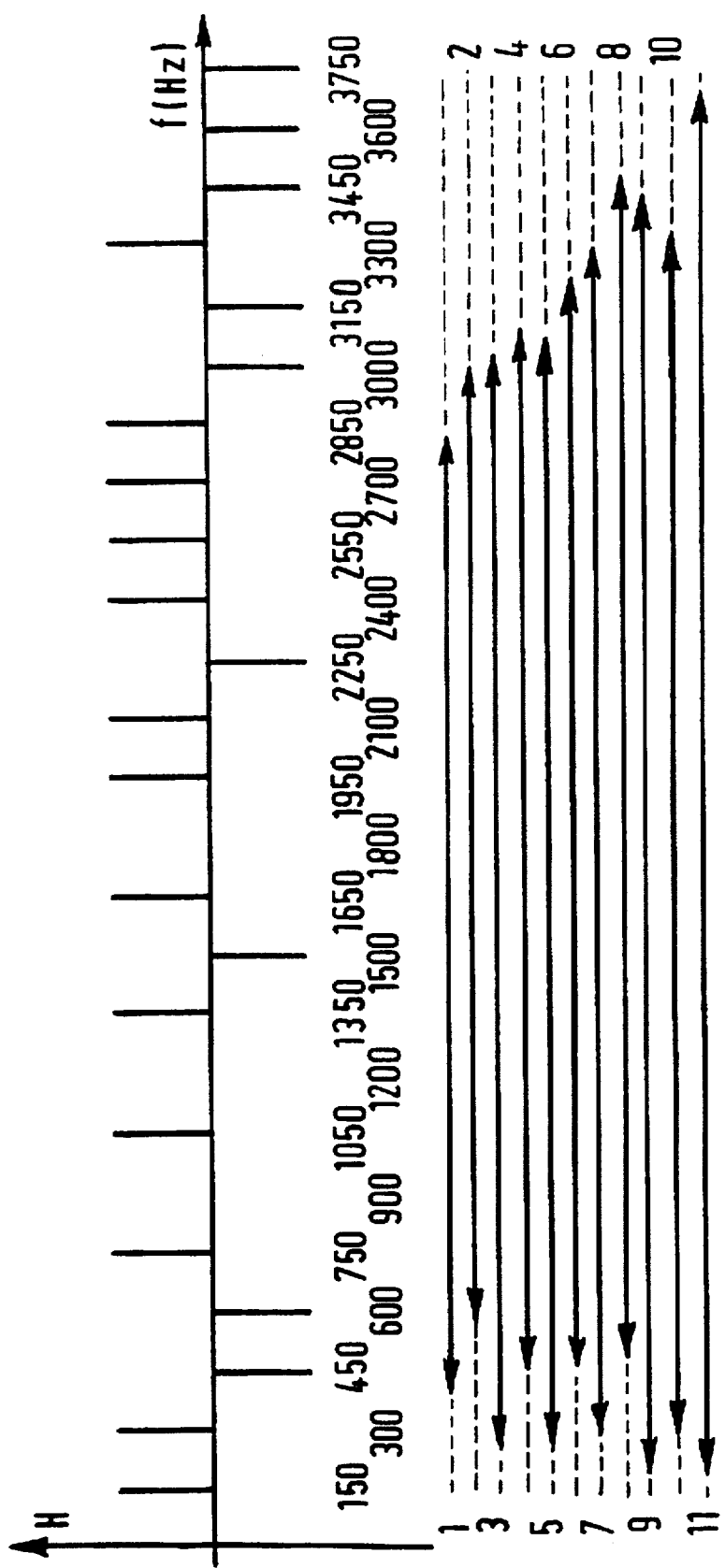
FIG. 1 represents a diagram showing the spreading of the frequencies transmitted in a sequence as well as the various authorized frequency bands.

At the start of the transmission (FIG. 4), a calling modem 100 transmits by a channel 105 to a called modem 110 two test sequences $L_1$ and $L_2$ respectively, which are used for determining the characteristic features of the channel and for selecting the modulation mode to be used. The sequence $L_2$ is identical with the sequence $L_1$, except that it is transmitted at 6 dB above the nominal power level. Preferably, the sequence $L_1$ is used. It is formed by a periodic set of tones (cosine) which are 150 Hz apart and have frequencies running from 150 Hz to 3750 Hz. The tones at 900 Hz, 1200 Hz, 1300 Hz and 2400 Hz are omitted, because they form particular tones for the communications between modems. FIG. 1 shows the tones used which are defined by $$f_i = 150 \times i \text{ (Hz)}$$

where $0 \leq i \leq 25$, and where $i \neq 6$, $i \neq 8$, $i \neq 12$, $i \neq 16$.

The signals generated for each tone have an initial phase equal to 180° for the tones of 450 Hz, 600 Hz, 1500 Hz, 2250 Hz, 3000 Hz, 3150 Hz 3450 Hz, 3600 Hz and 3750 Hz. The initial phase is zero for the other tones.

The tones comprise 10 different frequency bands numbered 1 to 11 which may be selected as a function of the noise conditions on the channel. In this example the channel is a telephone line.

The transmission of the sequence $L_1$ is meant for determining the quality of the channel for various bands which have various bit rates. In the case of the example considered here, the authorized bit rates are multiples of 2400 bit/s and vary from 2400 bit/s to 28.8 Kbit/s. The bandwidths are defined according to Table I:

TABLE I

| band-number | bandwith | center frequency | initial frequency | final frequency |
|---|---|---|---|---|
| 1 | 2400 | 1600 | 400 | 2800 |
| 2 | 2400 | 1800 | 600 | 3000 |
| 3 | 2743 | 1646 | 274 | 3017 |
| 4 | 2743 | 1829 | 457 | 3200 |
| 5 | 2800 | 1680 | 280 | 3080 |
| 6 | 2800 | 1867 | 467 | 3267 |
| 7 | 3000 | 1800 | 300 | 3300 |
| 8 | 3000 | 2000 | 500 | 3500 |
| 9 | 3200 | 1829 | 229 | 3429 |
| 10 | 3200 | 1920 | 320 | 3520 |
| 11 | 3429 | 1959 | 244 | 3673 |

The invention proposes to select the most favourable frequency band and bit rate for the transmission, while characteristic features of the channel at the moment of the test and characteristic features of the receiving means are taken into account.

When considering the frequency $f_i$, where i is a running index, the test sequence $L_1(f_i)$ transmitted by the calling station is received by the called station as a sequence $S(f_i)$, so that:

$$S(f_i) = H(f_i) \times L_1(f_i), \tag{1}$$

where $H(f_i)$ is the transfer function of the channel. Based on the received sequence $S(f_i)$ it is possible to determine $H(f_i)$. As the received sequence lies in the time domain, the sequence is to be subjected to a Fourier transform to determine coarsely the transfer function of the channel.

Figure 2:
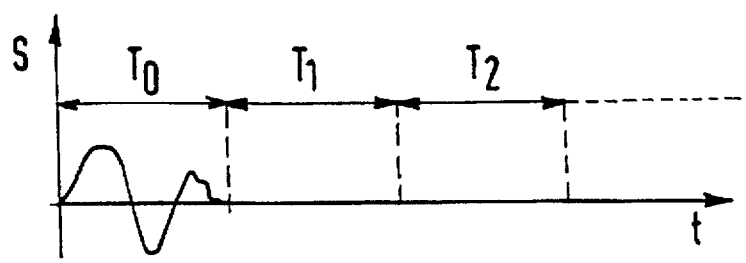
FIG. 2 shows an example in the time domain of the pattern of the signal of the sequence received by the receiving means.
Figure 3:
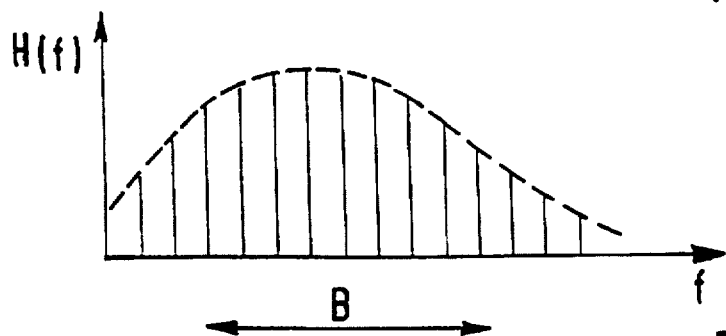
FIG. 3 shows an example of the transfer function of a channel.

FIG. 2 gives an example of the form of the sequence $S(f_i)$ received in a periodic manner plotted against time, in a sequence of periods T0, T1, . . . . For each period the sequence is sampled and a Fourier transform is performed which yields a channel transfer function $H(f_i)$. A series of Fourier transforms is carried out over various periods of the signal. For example, the following measurements will be obtained when 64 Fourier transforms are carried out:

TABLE II

| $H_0(150)$ | $H_1(150)$ . . . $H_{63}(150)$ | |
|---|---|---|
| $H_0(300)$ | $H_1(300)$ . . . $H_{63}(300)$ | |
| . . . | | |
| $H_0(3750)$ | $H_1(3750)$ | $H_{63}(3750)$ |
| $\leftarrow \rightarrow$ | $\leftarrow \rightarrow$ | $\leftarrow \rightarrow$ |
| $T_0$ | $T_1$ | $T_{63}$ |

Each component of Table II includes a noise component. There may, for example, be written:

$$H_0(150 \text{ Hz})[\text{measured}] = H_0(150 \text{ Hz})[\text{channel}] + N_0(150 \text{ Hz})[\text{noise}].$$

For each frequency (one row of Table II) is calculated a mean value of the channel transfer function for that particular frequency, so that:

$$H_{moy}(f_i) = 1/N \sum_{j=0}^{N-1} H_j(f_i), \tag{2}$$

where i is the particular frequency and j is the index of the particular period. In the selected example, N=64.

Similarly, the noise variance is calculated by:

$$\sigma^2_{moy}(f_i) = 1/N \sum_j H_j^2(f_i) - (H^2_{moy}(f_i)) \tag{3}$$

The results $H_{moy}(f_i)$ and $\sigma^2_{moy}(f_i)$ make it possible to define the characteristic features of the channel before the communication is established. In the following of the text, $H_{moy}(f_i)$ will be simplified to $H(f_i)$ and writing $\sigma^2_{moy}(f_i)$ will be simplified to $\sigma^2(f_i)$.

Figure 5:
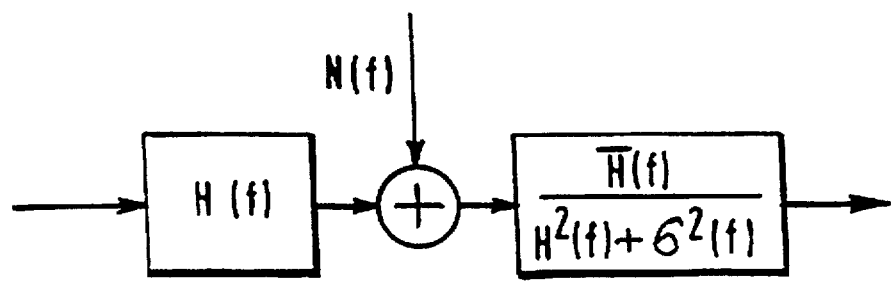
FIG. 5 shows a modelling of the transfer function of the channel, of the transfer function of the receiving means and of the additive noise.

FIG. 5 shows a theoretical model incorporating the channel, the superimposed noise and the called station. In this model the transfer function of the called station is equal to:

$$\frac{\overline{H}(f_i)}{H^2(f_i) + \sigma^2(f_i)} \tag{4}$$

where $\overline{H}(f_i)$ is the conjugate transfer function of the transfer function $H(f_i)$. From this model one may derive an approximate value of the signal power $P_S(f_i)$ on the output of the called station, so that:

$$P_S(f_i) = \frac{H^2(f_i)}{H^2(f_i) + 2\sigma^2(f_i)} \quad (5)$$

In this equation, terms considered negligible for normal receiving conditions have been omitted.

In the same manner is derived an approximate value of the noise power on the output of the called station by:

$$P_N(f_i) = \frac{\sigma^2(f_i)}{H^2(f_i) + 2\sigma^2(f_i)} \quad (6)$$

In reality, the called station itself generates the noise $\sigma_r^2$ which is to be taken into consideration for estimating the performance of the system. The signal power then becomes:

$$P_S(f_i) = \frac{H^2(f_i)}{H^2(f_i) + 2\sigma^2(f_i) + \sigma_r^2} \quad (7)$$

and the noise power becomes:

$$P_N(f_i) = \frac{\sigma^2(f_i)}{H^2(f_i) + 2\sigma^2(f_i) + \sigma_r^2}$$

The noise $\sigma_r^2$ generated by the called station is estimated beforehand by preliminary measures taken with known channels. This noise $\sigma_r^2$ is an intrinsic characteristic feature of the called station, which characteristic feature remains stable in the following during the test steps of the channel and during use.

By carrying out the various measures and by carrying out above calculations, the test means can estimate the signal-to-noise ratio that can be foreseen at the output of the called station and can consequently select the most appropriate frequency band and bit rate for the transmission.

Figure 6:
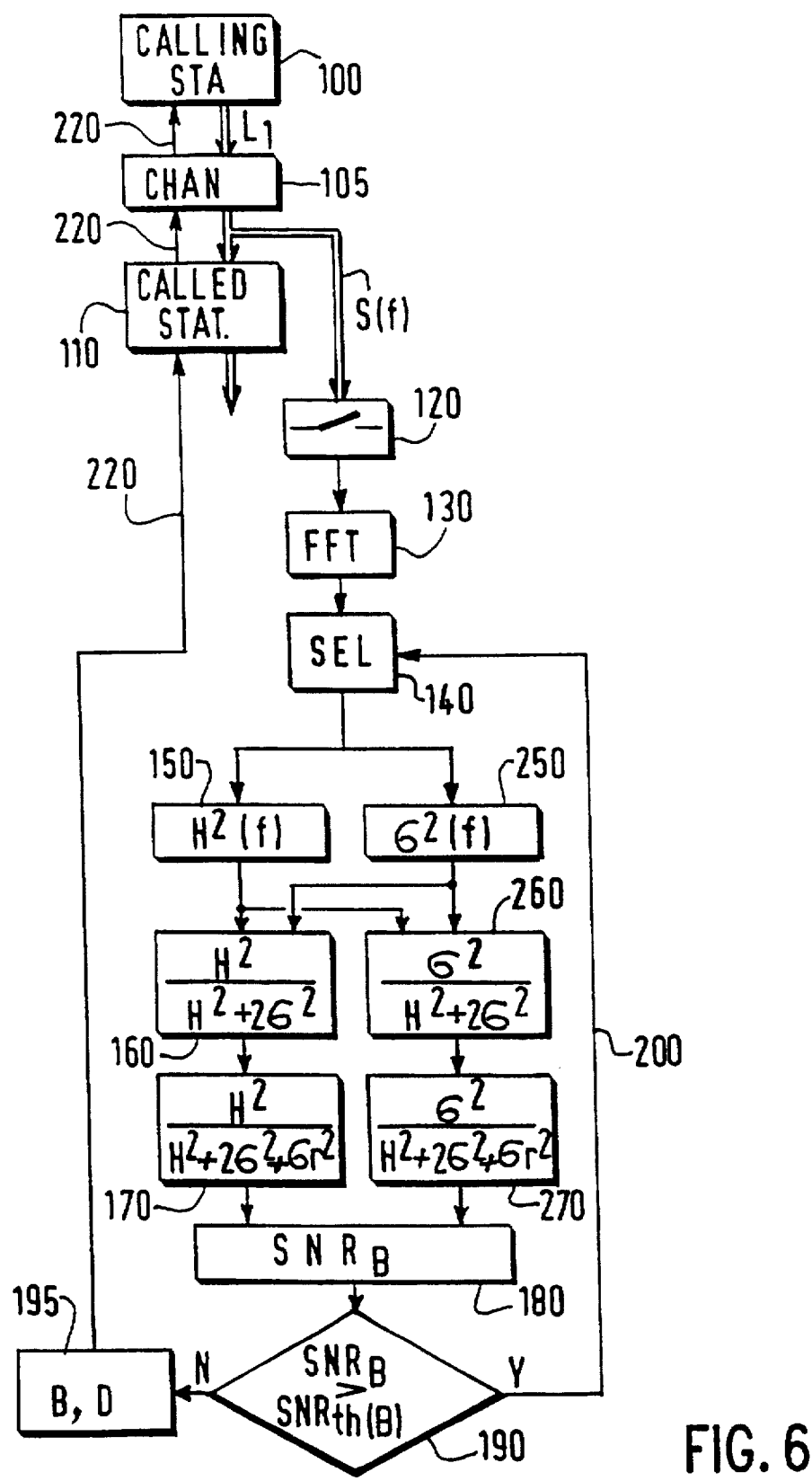
FIG. 6 shows a flow chart of various steps of the test method.

FIG. 6 shows a flow chart of the operations used in the method. The calling station [block 100] transmits the sequence $L_1$ by the channel [block 105]. The called station [block 110] receives a sequence $S(f_i)$ from the output of the channel. This sequence is sampled [block 120] after which a Fourier transform is performed [block 130] during each period constituting the sequence, to produce the measured transfer function of the channel. The method successively selects [block 140] each authorized communication band and then determines the characteristic channel features in each of these communication bands. It produces the power of the signal $H^2(f_i)$ [block 150] and the noise power $\sigma^2(f_i)$ [block 250] of the channel. Finally [blocks 160, 260], an estimation of the mean signal power is made in accordance with equation (5) and an estimation of the mean noise power in accordance with equation (6).

These calculations are completed by making use of the noise $\sigma_r^2$ inherent in the receiving means, such as the equalization means, demodulation means or other means. Based upon the equations (7) and (8), the method then determines for the tested band B an estimation of the signal-to-noise ratio on the output of the receiving means of the called station, so that:

$$SNR_B = \frac{\sum_{f_i \in B} P_S(f_i)}{\sum_{f_i \in B} P_N(f_i)}$$

Figure 7:
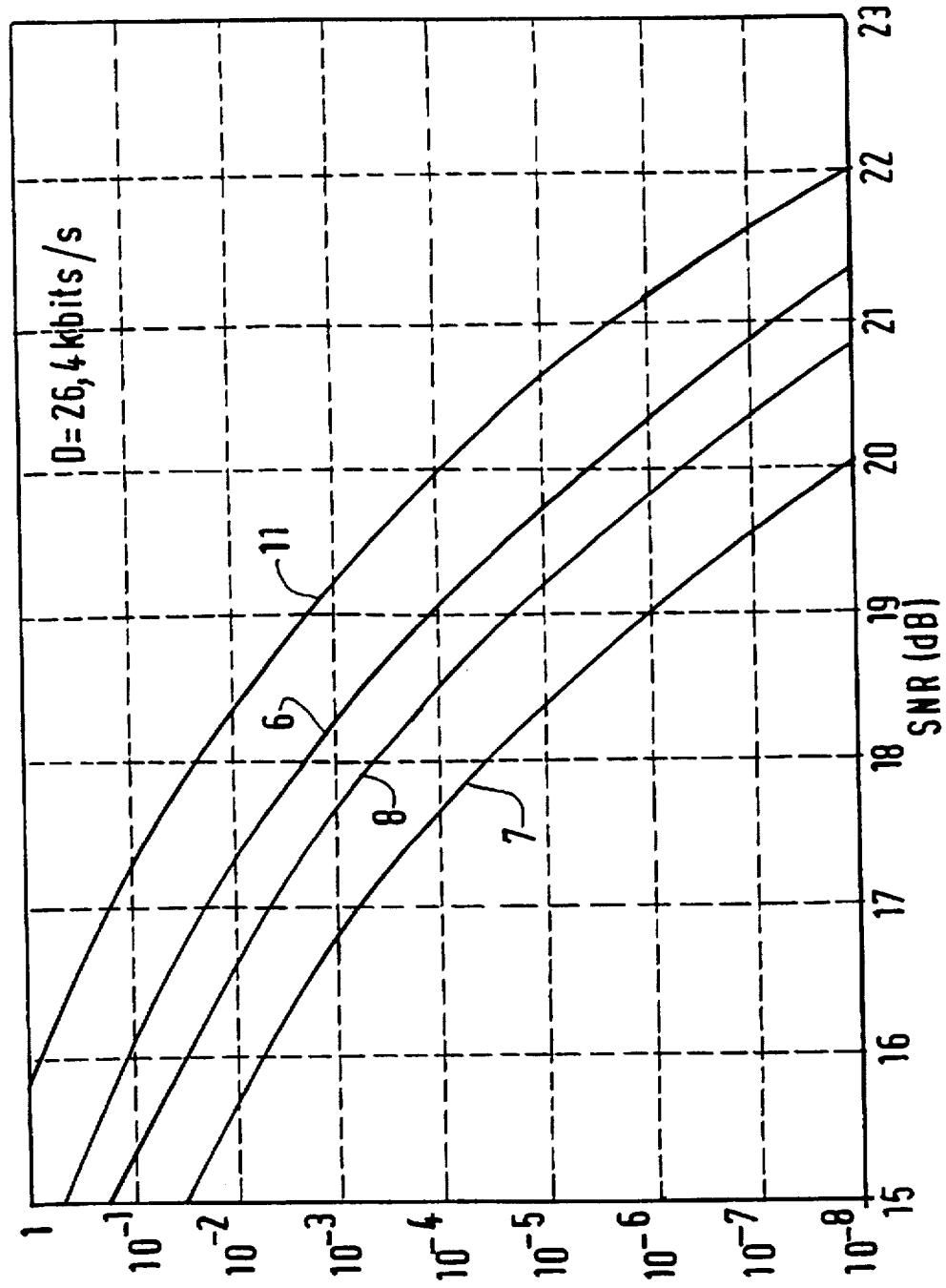
FIG. 7 shows curves which indicate theoretical variations of error probabilities plotted against the signal-to-noise ratio for various modulations in the case where there is a transmit bit rate of 26.4 kbit/s.

This estimation $SNR_B$ is compared [block 190] with known, previously determined theoretical values $SNR_{th(B)}$ which relate to these same bands B for various bit rates D. Such values can be derived, for example, from the curves shown in FIG. 7. In effect, one may calculate the maximum performance that can be obtained in the case of a perfect channel and a perfect called station. This performance depends among other things on the bit rate D at which one wishes to transmit by the channel and on the frequency band B used. In FIG. 7 is represented the error probability ERR plotted against the signal-to-noise ratio for various frequency bands in the case of a 26.4 kbit/s bit rate. In this drawing Figure the curves 6, 7, 8 and 11 correspond to the frequency bands 6, 7, 8 and 11 of FIG. 1. Similar curves exist for the other bands and for the other rates.

Thus, in a given band one may fix a maximum value for the error probability which, according to FIG. 7, will bring about a theoretical value $SNR_{th(B)}$ of the signal-to-noise ratio. This value $SNR_{th(B)}$ is compared in block 190 (FIG. 6) with the value measured at the moment of the test. When the measured value $SNR_B$ is higher than $SNR_{th(B)}$, another band is selected (connection 200) in the block 140 to perform the same test. All the bands for all the suitable rates are then tested by starting with the highest rates. When the measured value $SNR_B$ is lower than $SNR_{th(B)}$, the system transmits (connection 220) to the called station the band(s) B suitable for the transmission and the rate(s) D [block 195] which called station itself transmits the information to the calling station to establish the communication.

The estimation of the noise generated by the receiving means themselves is made during a preliminary step. Therefore, a channel is used which has known performance and the signal-to-noise ratio obtained on the output of the receiving means is measured. By using the equations 7 and 8, an estimation of the value $\sigma_r^2$ is obtained which forms a characteristic feature of the receiving means. Thereafter, it remains constant during the use of the system.

Figure 4:
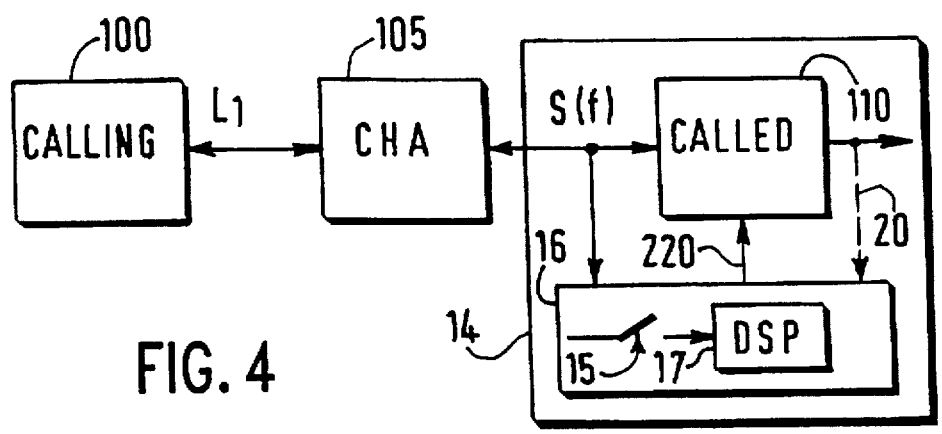
FIG. 4 shows a diagram of a communication system which comprises test means for testing the channel.

FIG. 4 shows a block circuit diagram of the whole transmission system. It comprises, while communicating by a channel 105, a calling station 100 and receiving means 14 which comprise a called station 110 and test means 16. The calling station transmits the sequence $L_1$ which becomes the sequence $S(f_i)$ upon arrival at the called station. The sequence $S(f_i)$ is fed to the test means 16 for measuring the quality of the channel. The test means comprise a sampler 15 followed by a digital signal processor DSP 17. The sampler 15 carries out step 120 of FIG. 6 and the processor 17 carries out the other steps of FIG. 6. When the bands and rates have been selected, the processor 17 transmits this information (connection 220) to the called station which transmits same in its turn to the calling station to establish the communication. Evidently, a calling station becomes a called station in the case of a reverse communication. This happens during the test procedure V.34 which is chosen as an example.

For carrying out the preliminary step intended to estimate the noise $\sigma_r^2$ generated by the called station, this called station is connected to various channels 105 in succession which have known characteristic features and for which known signal-to-noise ratio values occur. The signal-to-noise ratio is measured on the output of the called station (connection 20) and a value $\sigma_r^2$ of the noise which is compatible with the various expected signal-to-noise ratios is determined by successive approximations.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method of testing a communication channel by transmitting by the channel via transmitting means a test sequence which has a plurality of test frequencies and for selecting on the receiving side at least one frequency band suitable for transmission, the method including the following steps carried out by receiving means:

sampling the received sequence, performing, for various frequency bands and for various bit rates, at least one Fourier transform to calculate for the plurality of frequencies the channel transfer function and to derive therefrom a signal power within the band and a channel noise power within the band during said transmitting, calculating for each frequency band a ratio between the signal power and a noise power which includes the channel noise power and an estimated variance of the noise caused by the receiving means, comparing for each frequency band the ratio with a theoretical maximum ratio belonging to each band, selecting the frequency bands and the rates for which the ratios are smaller than the respective theoretical maximum ratios, and transmitting the selection to the transmitting means.

2. The method as claimed in claim 1 wherein the variance of the noise caused by the receiving means is estimated by comparing the signal-to-noise ratio of the output of the receiving means with the signal-to-noise ratio measured on the output of the channel for at least one channel that has known characteristic features.

3. A communication system comprising transmitting means and receiving means which communicate by a communication channel, in which the transmitting means transmits a test sequence comprising a plurality of test frequencies by the channel, and the receiving means comprise test means for testing a quality of the channel by calculating a transfer function of the channel and for selecting at least a frequency band for the transmission, characterized in that the test means comprise:

calculation means for calculating for various bit rates and for the plurality of test frequencies during transmission a channel noise power in frequency bands, calculation means for calculating for each frequency band a ratio between a power of the signal of the sequence and a noise power including the channel noise power and a variance of the noise caused by the receiving means, comparing means for comparing for each frequency band the ratio with a theoretical maximum ratio that belongs to each frequency band, and selecting means for selecting the frequency bands and the bit rates for which the ratios are smaller than the respective theoretical maximum ratios and for transmitting the selection to the transmitting means.

4. The communication system as claimed in claim 3 characterized in that the test means comprise a calculator for performing the calculations, comparisons and selections of frequency bands and bit rates.

5. The communication system as defined in claim 3 wherein the variance of the noise caused by the receiving means which is employed by the calculation means is an estimated variance.

* * * * *